(12) United States Patent
Nelson et al.

(10) Patent No.: US 12,453,979 B2
(45) Date of Patent: *Oct. 28, 2025

(54) SYSTEMS AND METHODS RELATED TO FLUID SPLASH CONTAINMENT

(71) Applicant: TBK PRODUCTS LLC, Manitowoc, WI (US)

(72) Inventors: Trent R. Nelson, Manitowoc, WI (US); Garet K. Galster, Pewaukee, WI (US); Tom Stewart, Lebanon, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,360

(22) Filed: Nov. 6, 2023

(65) Prior Publication Data

US 2024/0109082 A1 Apr. 4, 2024

Related U.S. Application Data

(63) Continuation of application No. 17/752,417, filed on May 24, 2022, now Pat. No. 11,806,732, which is a
(Continued)

(51) Int. Cl.
*B05B 1/26* (2006.01)
*B05B 1/06* (2006.01)
(Continued)

(52) U.S. Cl.
CPC ............... *B05B 1/267* (2013.01); *B05B 1/06* (2013.01); *E03D 9/002* (2013.01); *E03D 11/13* (2013.01)

(58) Field of Classification Search
CPC ........... B05B 1/267; B05B 1/06; B05B 1/323; E03D 9/002; E03D 11/13; E03D 9/00
(Continued)

(56) References Cited

U.S. PATENT DOCUMENTS

| 3,085,754 A | 4/1963 | Thompson |
| 4,130,247 A * | 12/1978 | Healy ................ B05B 1/30 239/533.1 |

(Continued)

FOREIGN PATENT DOCUMENTS

| CN | 108067363 | 5/2018 |
| DE | 20206139 U1 | 9/2002 |
| FR | 1331012 A | 5/1963 |

OTHER PUBLICATIONS

International Search Report and Written Opinion of the International Searching Authority, International Application No. PCT/US20/58821 (Mar. 9, 2021; 8 pages).

(Continued)

*Primary Examiner* — Lori L Baker
(74) *Attorney, Agent, or Firm* — Smith Keane LLP

(57) ABSTRACT

Systems and methods for containing fluid splash include using a fluid flow spaced from a vessel and/or fluid surface to effectively trap materials from a fluid stream flowing through the fluid flow. The fluid flow creates a spray envelope in connection with the fluid surface and/or vessel and substantially prevents droplets of the fluid stream from exiting the vessel. The fluid flow is created by allowing a supply fluid to flow through a nozzle oriented to cast a spray pattern into the vessel and/or into contact with the fluid surface. The fluid flow may be selectively activated and deactivated and/or be automatically (e.g., light or motion) activated and deactivated.

19 Claims, 13 Drawing Sheets

Related U.S. Application Data continuation-in-part of application No. 17/089,042, filed on Nov. 4, 2020, now Pat. No. 11,339,560.

(60) Provisional application No. 62/941,504, filed on Nov. 27, 2019.

(51) Int. Cl.
*E03D 9/00* (2006.01)
*E03D 11/13* (2006.01)

(58) Field of Classification Search
USPC ............... 4/300.3, 300, 415; 210/285, 521; 239/461, 518
See application file for complete search history.

(56) References Cited

U.S. PATENT DOCUMENTS

| | | |
|---|---|---|
| 4,709,426 A | 12/1987 | Godwin, Jr. |
| 7,775,457 B2 | 8/2010 | Schnuckle |
| 7,850,098 B2 | 12/2010 | Vogel et al. |
| 9,422,701 B2 | 8/2016 | Martin |
| 9,809,964 B1 | 11/2017 | Williams |
| 9,962,718 B2 | 5/2018 | Vogel et al. |
| 2006/0096015 A1 | 5/2006 | Lim |
| 2016/0228891 A1 | 8/2016 | Rosko et al. |
| 2020/0063420 A1 | 2/2020 | Moscovits et al. |
| 2020/0154960 A1 | 5/2020 | Le |
| 2021/0156129 A1* | 5/2021 | Nelson .................... E03D 11/13 |
| 2022/0080433 A1* | 3/2022 | Burkart .................. B05B 1/267 |
| 2022/0280956 A1 | 9/2022 | Nelson et al. |

OTHER PUBLICATIONS

USPTO, Office Action for related U.S. Appl. No. 17/089,042, dated Aug. 19, 2021, 10 pages.

UK Intellectual Property Office Examination Report for Application GB2207001.5, dated May 9, 2023, 5 pages.

UK Intellectual Property Office Examination Report for Application GB2207001.5, dated Jul. 25, 2023, 6 pages.

UK Intellectual Property Office Examination Report for Application GB2207001.5, dated Oct. 31, 2023, 7 pages.

International Search Report and Written Opinion of the International Searching Authority, International Application No. PCT/US23/67397 (Sep. 26 2023; 7 pages).

* cited by examiner

SYSTEMS AND METHODS RELATED TO FLUID SPLASH CONTAINMENT

RELATED APPLICATIONS

This application is a continuation of co-pending U.S. patent application Ser. No. 17/752,417, filed 24 May 2022, entitled Systems and Methods Related to Fluid Splash Containment, which is a continuation-in-part of U.S. Pat. No. 11,339,560, filed 4 Nov. 2020, entitled Systems and Methods Related to Fluid Splash Containment, which claims priority to and claims the benefit of U.S. provisional patent application No. 62/941,504, filed 27 Nov. 2019, and entitled Systems and Methods Related to Fluid Splash Containment, all of which are incorporated by reference herein in its entirety.

BACKGROUND OF THE INVENTION

Containment of fluid splashes within a defined area or volume can be difficult. Such containment may be required or desired in manufacturing operations, cleaning operations, or even household situations, such as waste fluid containment. Where a stream of fluid is introduced onto or into a substantially hydrostatic (generally at rest) fluid surface, or onto a solid surface, and the stream continues to flow for some duration, albeit at various locations, rates, and/or pressures, splashing tends to occur.

There are thought to be multiple causes for splashing in such situation (e.g., a urine stream entering initially substantially hydrostatic toilet water or other receptacle or vessel). A first cause of splashing is thought to be reflection or deflection of the stream off of the hydrostatic surface or receptacle (e.g., toilet or urinal) surface. A second cause of splashing may include the receiving fluid (e.g., toilet water) reacts to the stream introduction and splashes outward from the stream intersection point. A third cause of splashing may be combinations of the first two causes, which may be precipitated by a change in direction, flow rate, and or pressure of the stream.

Prior methods have been developed in an effort to contain fluid splashes. A first method is to treat the receiving fluid itself, such as with a surfactant, to lower the surface tension of the receiving fluid. In this manner, the exposed or quiescent surface of the receiving fluid may be caused to form a splash-insulative surface of bubbles upon entry and continued flow of the stream into the receiving fluid. While this method has proved partially successful, it requires constant chemical treatment of the receiving water (e.g., after a toilet is flushed) and may not adequately protect against splashes caused at the time of stream entry (i.e., reflection or deflection) and prior to the formation of the bubble layer.

Another prior method has been to increase the amount of physical structure of a fluid receptacle so as to create a physical barrier or shield to physically capture splash droplets. There are multiple problems to this attempted solution. First, the additional structure can be bulky and unattractive, and may even impede use of receptacles by particular users. Second, the physical structure or shield requires frequent and thorough cleaning to remain hygienic. Third, a physical structural barrier is not always effective in capturing splash droplets that may be moving substantially opposite to the direction of the stream flow.

Accordingly, the art of fluid splash containment would benefit from improved systems and methods to address at least some of the problems associated with prior methods.

SUMMARY OF THE INVENTION

Embodiments of systems and methods according to the present invention relate generally to fluid splash containment, and more particularly to spray envelopes to receive a stream of fluid.

According to an aspect of an embodiment of a system according to the present invention, the system includes a waste receptacle capable of holding a fluid and a first nozzle supported by the waste receptacle. The first nozzle is configured to direct a first laminar flow of a liquid received from a liquid supply into the waste receptacle, the first laminar flow comprising an at least partial dome of the liquid.

According to another aspect of an embodiment of a system according to the present invention, the system also includes a supply line through which the liquid is to be received by the first nozzle.

According to still another aspect of an embodiment of a system according to the present invention, the system further includes a first flow valve capable of controlling a flow of liquid through the supply line.

According to yet another aspect of an embodiment of a system according to the present invention, the system further includes a power supply configured to selectively activate the first flow valve.

According to a further aspect of an embodiment of a system according to the present invention, the power supply is controlled by a switch.

According to a still further aspect of an embodiment of a system according to the present invention, the switch is a normally open momentary switch.

According to a still further aspect of an embodiment of a system according to the present invention, the system further includes a motion sensor configured to selectively activate the switch.

According to a still further aspect of an embodiment of a system according to the present invention, the power supply is controlled by a timer configured to actuate the valve after a predetermined amount of time.

According to a still further aspect of an embodiment of a system according to the present invention, the predetermined amount of time is programmable.

According to a still further aspect of an embodiment of a system according to the present invention, the first flow valve is a solenoid-controlled valve.

According to a still further aspect of an embodiment of a system according to the present invention, the system further includes a second flow valve placed in series with the supply line, between the first flow valve and the nozzle.

According to a still further aspect of an embodiment of a system according to the present invention, the second flow valve is a restrictor valve configured to limit flow of the liquid to the nozzle to a maximum rate.

According to a still further aspect of an embodiment of a system according to the present invention, the supply line is operatively coupled to a water main line.

According to a still further aspect of an embodiment of a system according to the present invention, the supply line is gravity fed from a holding tank.

According to a still further aspect of an embodiment of a system according to the present invention, the waste receptacle includes a drain opening and a first opening through which waste is received, the at least partial dome being visible through the first opening.

According to a still further aspect of an embodiment of a system according to the present invention, the first flow valve is a manually operated liquid control valve.

According to an aspect of an embodiment of a method according to the present invention, the method includes the steps of supporting a first nozzle relative to a waste receptacle, the first nozzle configured to direct a first laminar flow of a liquid received from a liquid supply into the waste receptacle, the first laminar flow comprising an at least partial dome of the liquid.

According to an aspect of an embodiment of a method according to the present invention, the method also includes the step of directing a first flow of a liquid received from a liquid supply into a waste receptacle, the first flow comprising an at least partial dome of the liquid.

According to another aspect of an embodiment of a method according to the present invention, the first flow is an at least substantially laminar flow.

BRIEF DESCRIPTION OF THE DRAWINGS

FIG. 13a is a cross-sectional view taken at line 13-13 in FIG. 12.

FIG. 13b is a partial blown up view taken from FIG. 13a.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
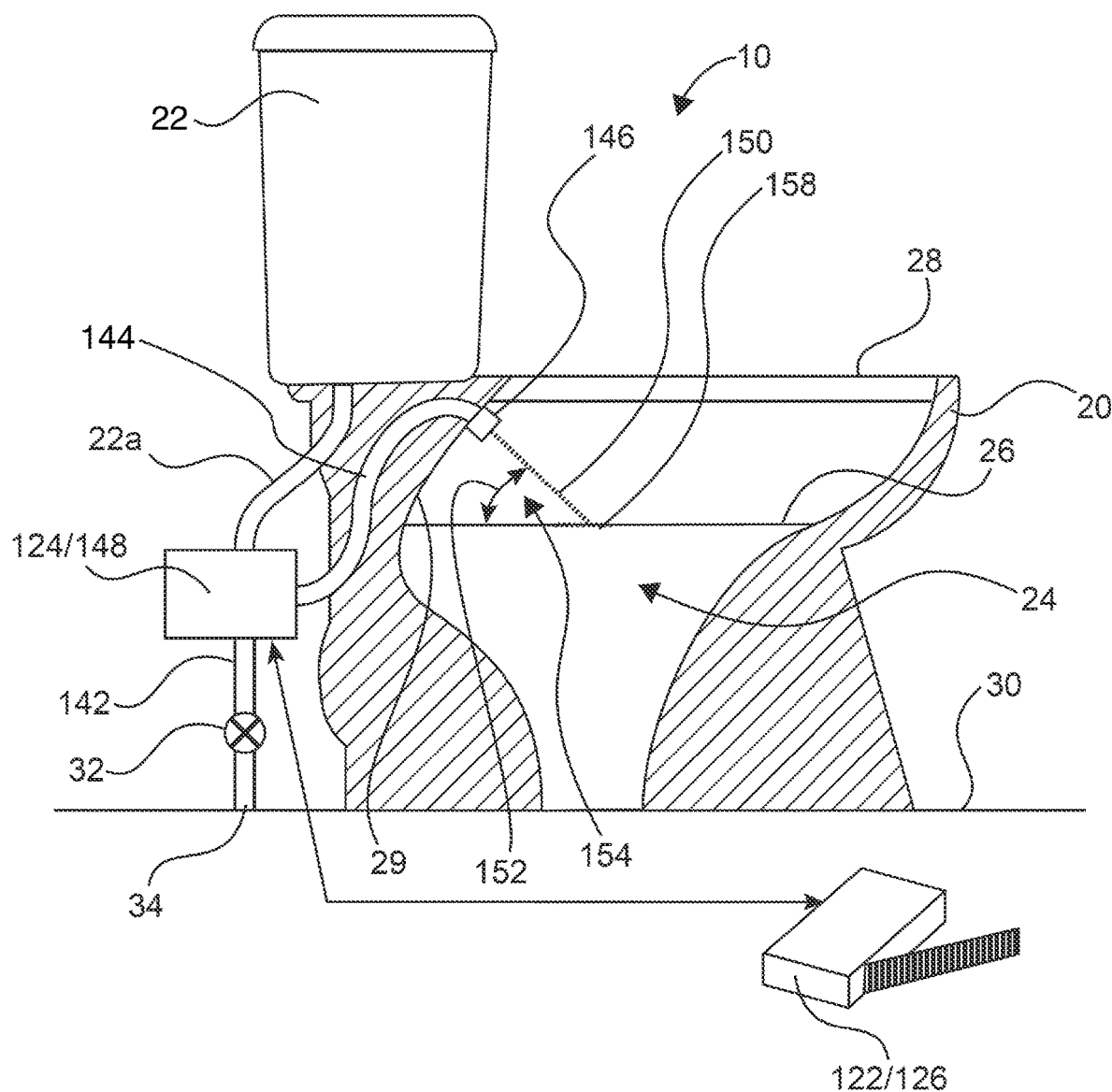
FIG. 1 is a partial cutaway view of a first embodiment of a fluid splash containment system according to the present invention.
Figure 2:
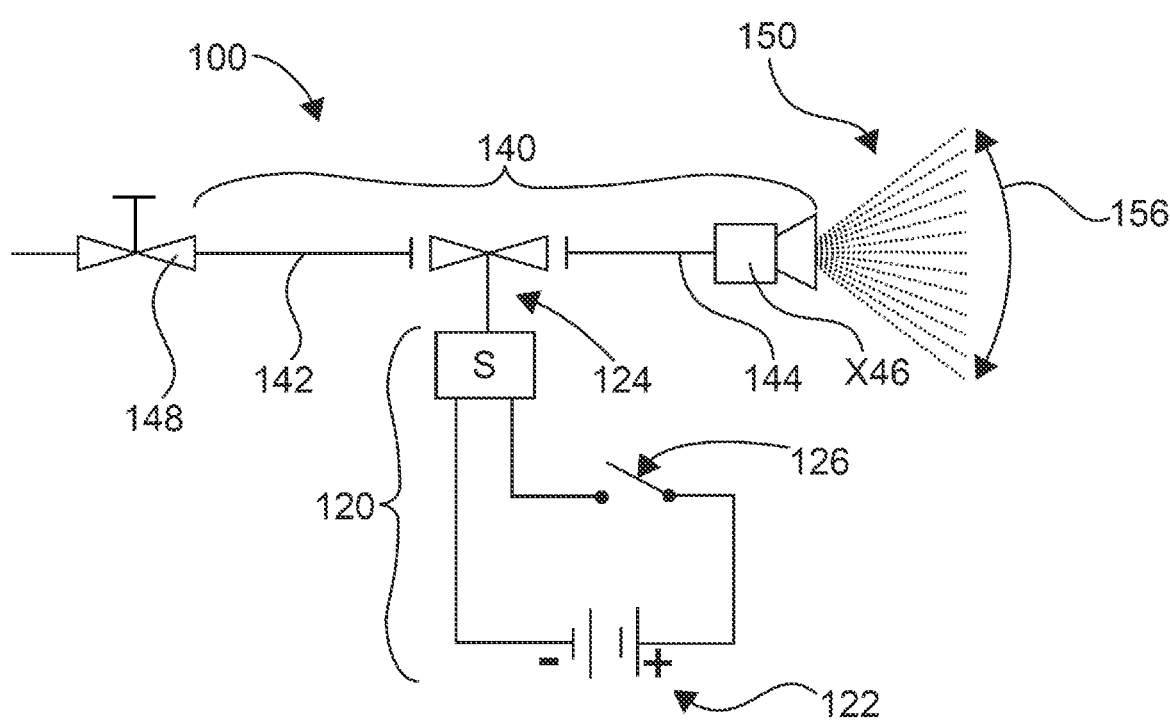
FIG. 2 is a schematic representation of a fluid splash containment system according to the present invention.
Figure 3:
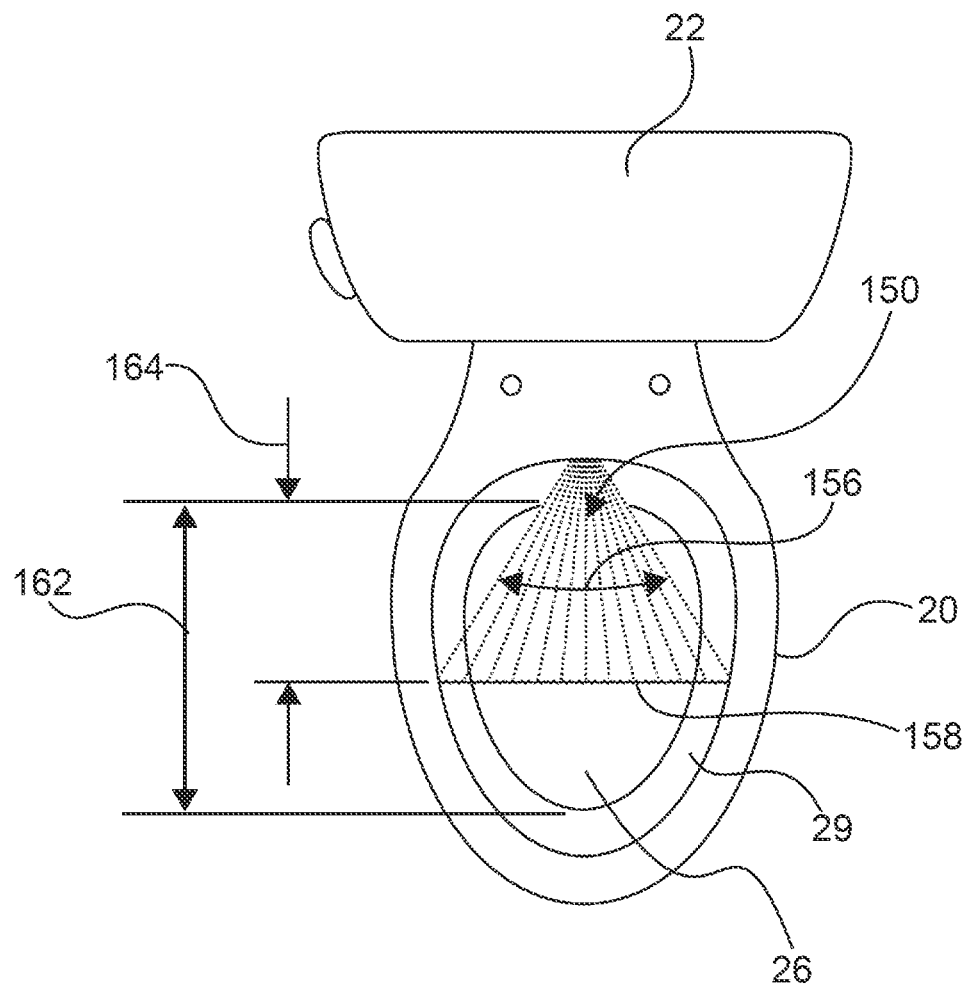
FIG. 3 is a partial top plan view of the system according to FIG. 1.

Turning now to FIGS. 1-3, a first embodiment 100 of a fluid splash containment system according to the present invention may be described. The system 100 generally includes an electrical circuit 120 which at least partially controls a liquid circuit 140. While variations of the system 100 are described throughout, it is to be understood that many of the elements of the circuits 120,140 may be interchanged and used in alternative embodiments. The electrical circuit 120 preferably includes a power supply 122, such as a 9-volt DC battery or a converted DC power supply received from a converter that may be connected to power mains. The power supply 122 is used to selectively activate (or deactivate) a solenoid-controlled valve 124 to control liquid flow from a liquid supply line 142 into a feed line 144 to a nozzle 146 to create a desired fluid flow (e.g., spray pattern 150). Though discussed throughout the following description as a spray pattern 150, the flow could likewise be less turbulent or even substantially non-turbulent (lower Reynolds number flow) such as is provided in a laminar sheet flow established by a relatively flat laminar nozzle or even a complete or partial laminar flow dome. A laminar flow dome nozzle can be seen in U.S. Pat. No. 7,775,457 to Schnuckle, which is incorporated by reference herein in its entirety, and is described more fully below in connection with FIG. 10. Though shown in the figures as a substantially planar flow, it is to be understood that the flow may be not completely planar. That is, the flow may be a predetermined flow, which may be planar, substantially planar, or even curved (e.g., affected by gravity and/or other forces or design considerations).

The selective activation or deactivation of the valve 124 may be accomplished with a single pole, single throw switch 126, which may be a normally open momentary switch. Additionally or alternatively, the electrical circuit may include motion sensor (not shown) control or supplementation of the switch 126. The motion sensor may be touchless (e.g., infrared, light, etc.) or it may be activated by motion of an object, such as the position or movement (e.g., limit switches or capacitive sensing) of a toilet seat (not shown). Additionally or alternatively, the electrical circuit may include a timer in combination with a sensor/switch so as to allow activation for a predetermined time after initial activation (sensing or switching). Alternatively, the valve 124 may not be electrical at all, and may be a manually operated fluid control valve that is operated by a momentary diaphragm valve or twist valve.

FIG. 1 shows the system 100 installed on a conventional porcelain toilet 20, generally establishing a splash control system 10. As is known, the toilet 20 includes a flush supply tank 22 (fed by a tank supply line 22a) to supply water to a toilet cavity 24. Generally, when a toilet 20 is ready for use, a hydrostatic water surface 26 will be disposed generally horizontally (and at least substantially parallel) with respect to a support surface 30, such as a floor, and an upper edge 28 of the toilet bowl 29 surrounding the cavity 24.

Installation of the system 100 on a receptacle (e.g., toilet 20) can be accomplished a variety of ways, and the system 100, or portions thereof, may even be built integrally as a part of a toilet 20. Generally, a nozzle 146 is secured to the toilet bowl 29 (or is otherwise incorporated into the structure of the toilet 20) and aimed towards an opposite side of the bowl 29, at a desired spray angle 152 with respect to the hydrostatic surface 26. While shown in discrete positions for disclosure of representative embodiments, it is to be understood that nozzle(s) X46 may be positioned at any one or more positions about the periphery of the inner surface of the receptacle. A preferred spray angle 152 is between 15 degrees and about 90 degrees, with greater than about 30 degrees being more preferred, and about 65 degrees being most preferred. The solenoid-controlled valve 124 is placed in fluid communication with the supply line 142 and electrically coupled to the power supply 122 and switch 126 (and/or other actuating sensor or switch). If desired, an additional manual or electrically controlled flow valve 124 may be placed in series as a part of the supply line 142 so as to aid in adjusting the nozzle spray pattern 150. The supply line 142 may be an extension of or coupled (such as through a valve 32) to a standard toilet supply line 34, which is coupled to a water main, such as a building water main. Alternatively, supply line 142 may be gravity fed from a holding tank or even from a pump to provide desired pressure.

In this way, when activated, the spray pattern 150 generally creates a spray envelope 154, which may also be defined or at least partially surrounded by the surface 26 and/or a portion of the receptacle, such as the toilet bowl 29. A preferred spray pattern is a flat fan pattern having a preferred spread angle 156. A preferred spread angle 156 is between about 45 degrees to about 135 degrees, with 80 degrees being most preferred. The spray pattern 150 contacts the water surface 26 along a confluence intersection 158, which may be a substantially linear spattering of droplets of the spray pattern 150 (e.g., water) or of the fluid (e.g. water or water/urine mixture) forming the hydrostatic surface 26. The surface 26 extends along a surface length 162 extending parallel to the support surface 30 and measured from a first point on the hydrostatic surface 26 closest to the nozzle 146 and to a second point on the surface 26 diametrically opposed across the vessel 20 from the first point. Parameters such as spray angle 152, spread angle 156, pressure supplied via the supply line 142, etc., may be adjusted to position the confluence intersection 158 along the surface length 162 at a predetermined distance 164, such as less than or equal to half of the surface length 162. Adjustments may be made to achieve a desired spray pattern 150 and to minimize overspray outside of the vessel 20 that may be caused by excessive supply pressure.

In use, once adjusted to desired flow rate and spray pattern 150, a stream of fluid (e.g., a urine stream) may be passed from a side of the spray pattern 150 outside of the spray envelope 154 (e.g., from outside of the cavity 24) through the spray pattern 150 and into the spray envelope 154 to contact the fluid surface 26 and/or the surface of the bowl 29. To the extent any splashing occurs within the spray envelope 154 due to the stream of fluid contacting the fluid surface 26 and/or the vessel 29, such splashing is contained substantially within the spray envelope 154 or is at least substantially prevented from exiting the cavity 24.

Figure 4:
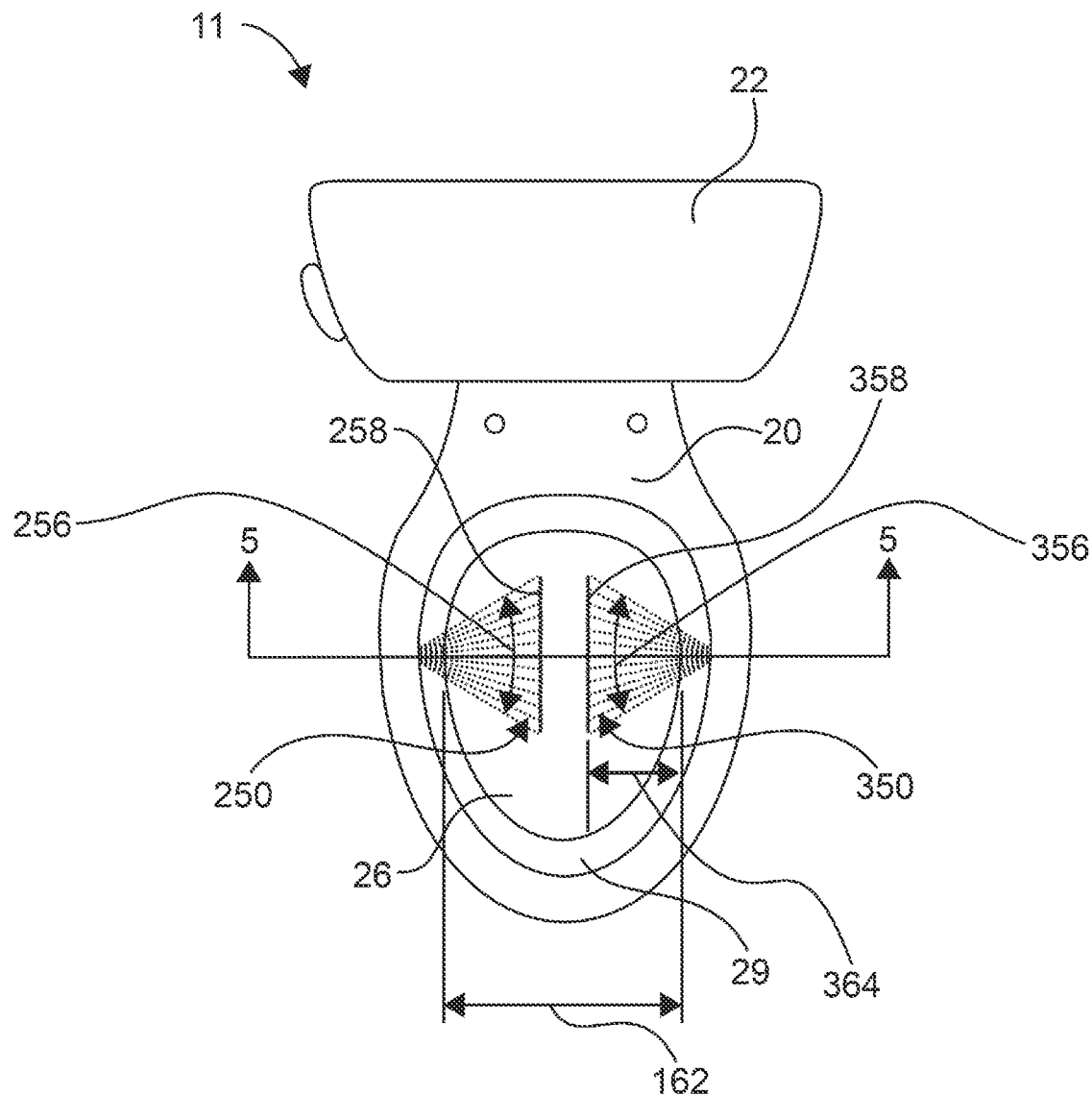
FIG. 4 is a partial top plan view of a second embodiment of a fluid splash containment system according to the present invention.
Figure 5:
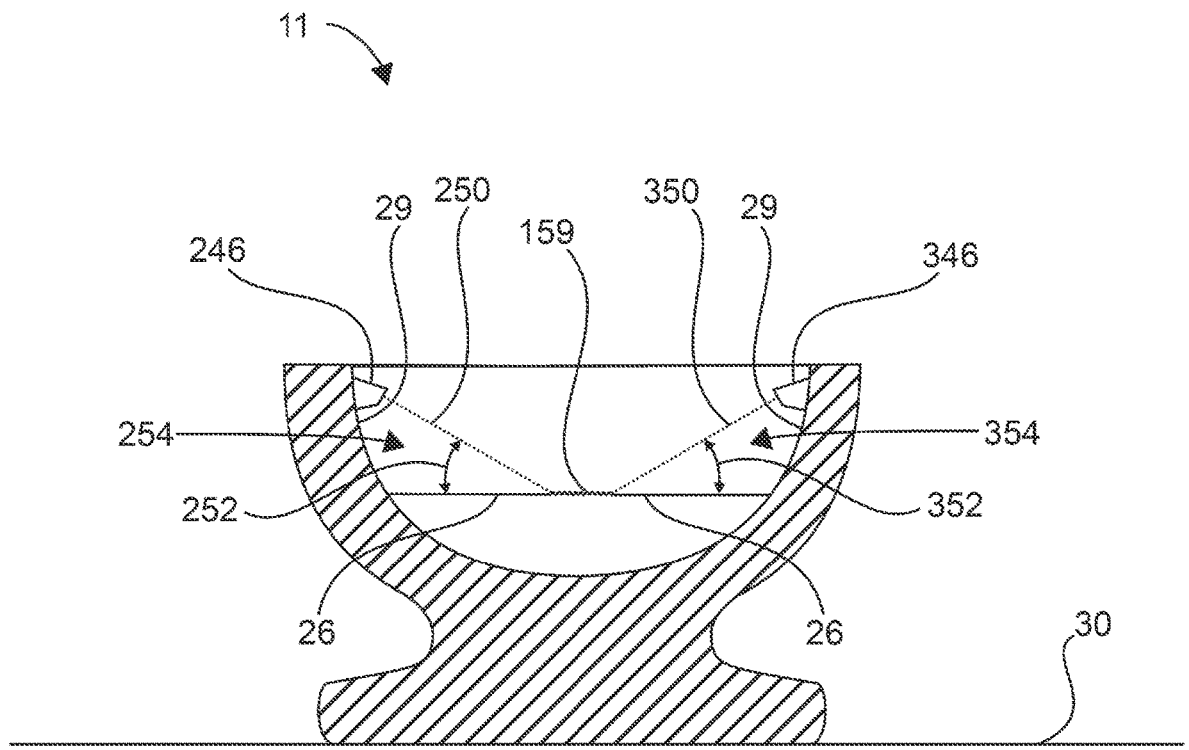
FIG. 5 is a partial cross-section view taken along line 5-5 of FIG. 4.

FIGS. 4-5 depict another embodiment 11 of a splash control system according to the present invention, where similar numbering indicates identical or substantially similar structure or disclosure as with respect to the first embodiment 10. In this embodiment 11, a plurality of spray patterns are provided by a plurality of nozzles. Much like the first embodiment, installation can be accomplished a variety of ways, and the system may even be built into as a part of a toilet 20. Generally, nozzles 246,346 are secured to the toilet bowl 29, and are each aimed towards an opposite side of the bowl 29, at a desired spray angle 252,352 with respect to the hydrostatic surface 26. Both nozzles 246,346 may be arranged in a parallel relationship in the liquid circuit, both being supplied by the feed line 144 from the solenoid-controlled valve 124. The solenoid-controlled valve 124 is placed in fluid communication with the supply line 142 and electrically coupled to the power supply 122 and switch 126. If desired, an additional manual or electrically controlled flow valve 124 may be placed in series as a part of the supply line 142 so as to aid in adjusting the nozzle spray patterns 250,350. The supply line 142 may be an extension of or coupled (such as through a valve 32) to a standard toilet supply line 34, which is coupled to a water main, such as a building water main. Alternatively, supply line 142 may be gravity fed from a holding tank or even from a pump to provide desired pressure.

In this way, when activated, the spray patterns 250,350 generally create multiple spray envelopes 254,354, which may also be defined or at least partially surrounded by the surface 26 and/or a portion of the receptacle, such as the toilet bowl 29. A preferred spray pattern is a flat fan pattern having a preferred spread angle 156. A preferred spread angle 256,356 is between about 45 degrees to about 135 degrees, with 80 degrees being most preferred. The multiple spread angles 256,356 may be substantially similar or identical, or they may be substantially different but yet within the preferred range. The spray patterns 250,350 contact the water surface 26 along respective confluence intersections 258,358, which may be a substantially linear spattering of droplets of the respective spray pattern 250,350 (e.g., water) or of the fluid (e.g. water or water/urine mixture) forming the hydrostatic surface 26. The surface 26 extends along a surface length 162 extending parallel to the support surface 30 and measured from a first point on the hydrostatic surface 26 closest to the first nozzle 246 and to a second point on the hydrostatic surface 26 closest to the second nozzle 346. Parameters such as spray angles 252,352, spread angles 256,356, pressure supplied via the supply line 142, etc., may be adjusted to position the confluence intersections 258,358 along the surface length 162 at a respective predetermined distance 264,364, such as less than or equal to half of the surface length 162. Adjustments may be made to achieve desired spray patterns 250,350 and to minimize overspray outside of the vessel 20 that may be caused by excessive supply pressure. In this embodiment 11, if the confluence intersections 258,358 are separate, they may be positioned at a predetermined distance to create a turbulent channel 159 therebetween. This turbulent channel 159, along with the spray envelopes 254,354, can assist in splash prevention. Alternatively, parameters such as spray angles 252,352, spread angles 256,356, pressure supplied via the supply line 142, etc., may be adjusted such that the spray patterns 250,350 overlap, thereby creating overlapping spray envelopes 254,354.

In use, once adjusted to desired flow rate and spray patterns 250,350, a stream of fluid (e.g., a urine stream) may be passed from a side of the spray pattern 250 or 350 outside of the spray envelope 254 or 354 (e.g, outside of the cavity 24) through the spray pattern 250 or 350 and into the respective spray envelope 254 or 354 to contact the fluid surface 26 and/or the bowl 29. To the extent any splashing occurs within the spray envelope 254 or 354 due to the stream of fluid contacting the fluid surface 26 and/or the vessel 29, such splashing is contained substantially within the spray envelope 254 or 354 or is at least substantially prevented from exiting the cavity 24. Alternatively or additionally, a stream of fluid (e.g., a urine stream) may be introduced into the turbulent channel 159 and contained thereby.

Figure 6:
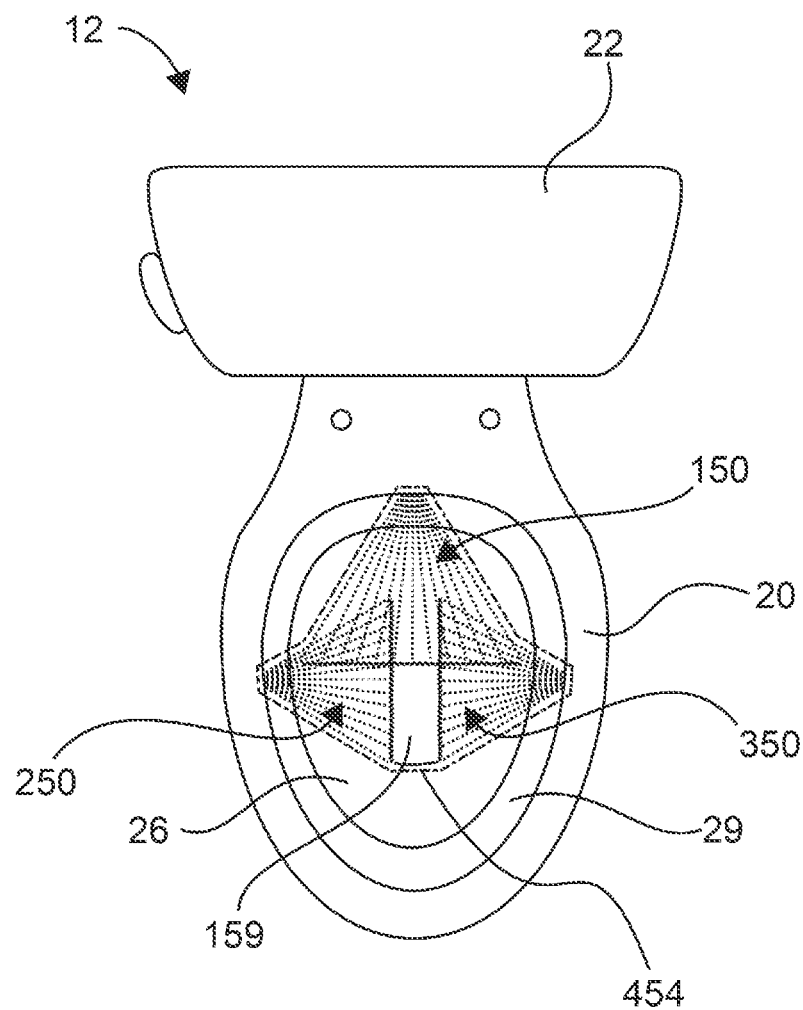
FIG. 6 is a partial top plan view of a third embodiment of a fluid splash containment system according to the present invention.

FIG. 6 depicts another embodiment 12 of a splash control system according to the present invention, where similar numbering indicates identical or substantially similar structure or disclosure as with respect to the first embodiment 10.

In this embodiment 12, a plurality of spray patterns are provided by a plurality of nozzles. For instance, the two nozzles 246,346 from the second embodiment 11 may be combined with the nozzle 146 from the first embodiment, such that three (or more) spray patterns overlap to form a splash prevention area 454, which includes multiple spray envelopes 154,254,354 and may include a turbulent channel 159. The splash prevention area 454 preferably covers a majority of the fluid surface 26. The three nozzles 146,246, 346 are preferably arranged in a parallel relationship in the liquid circuit, all being supplied by the feed line 144 from the solenoid-controlled valve 124.

Figure 7:
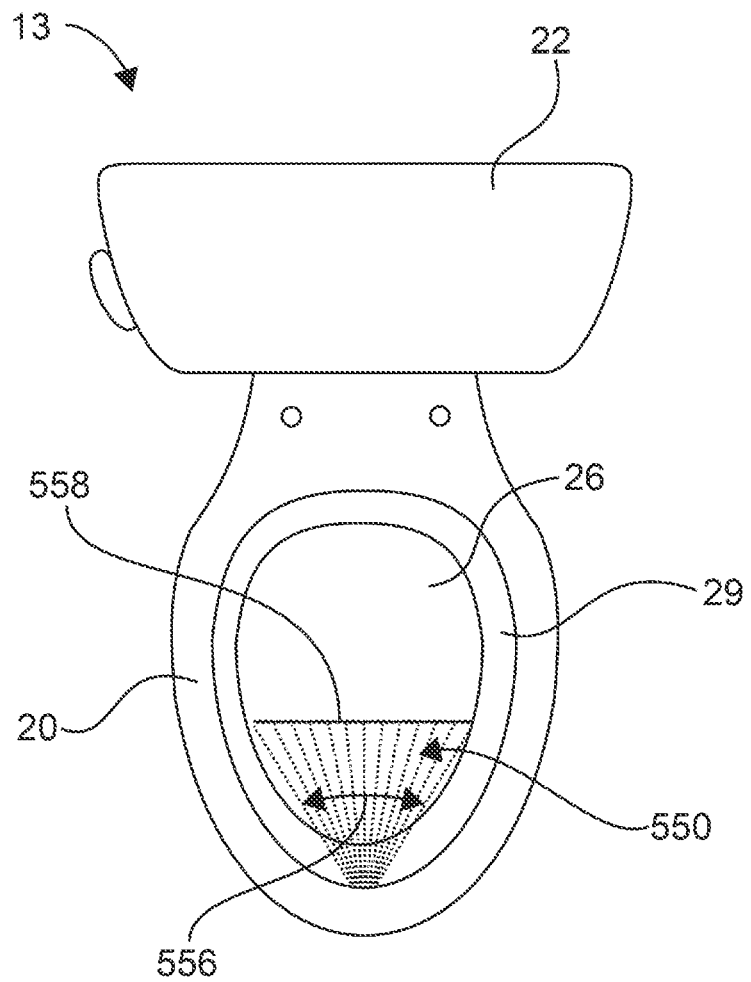
FIG. 7 is a partial top plan view of a fourth embodiment of a fluid splash containment system according to the present invention.

FIG. 7 depicts a fourth embodiment 13 of a splash control system according to the present invention, where similar numbering indicates identical or substantially similar structure or disclosure as with respect to the first embodiment 10. In this embodiment, a nozzle is placed in a position to spray from a front of a toilet 20 towards the tank 22. Such arrangement may prove beneficial to assist in containing splash that may otherwise be caused by users of the toilet 20 that sit on the toilet 20 rather than stand. This arrangement may be used alone or in conjunction with any of the prior embodiments.

Figure 8:
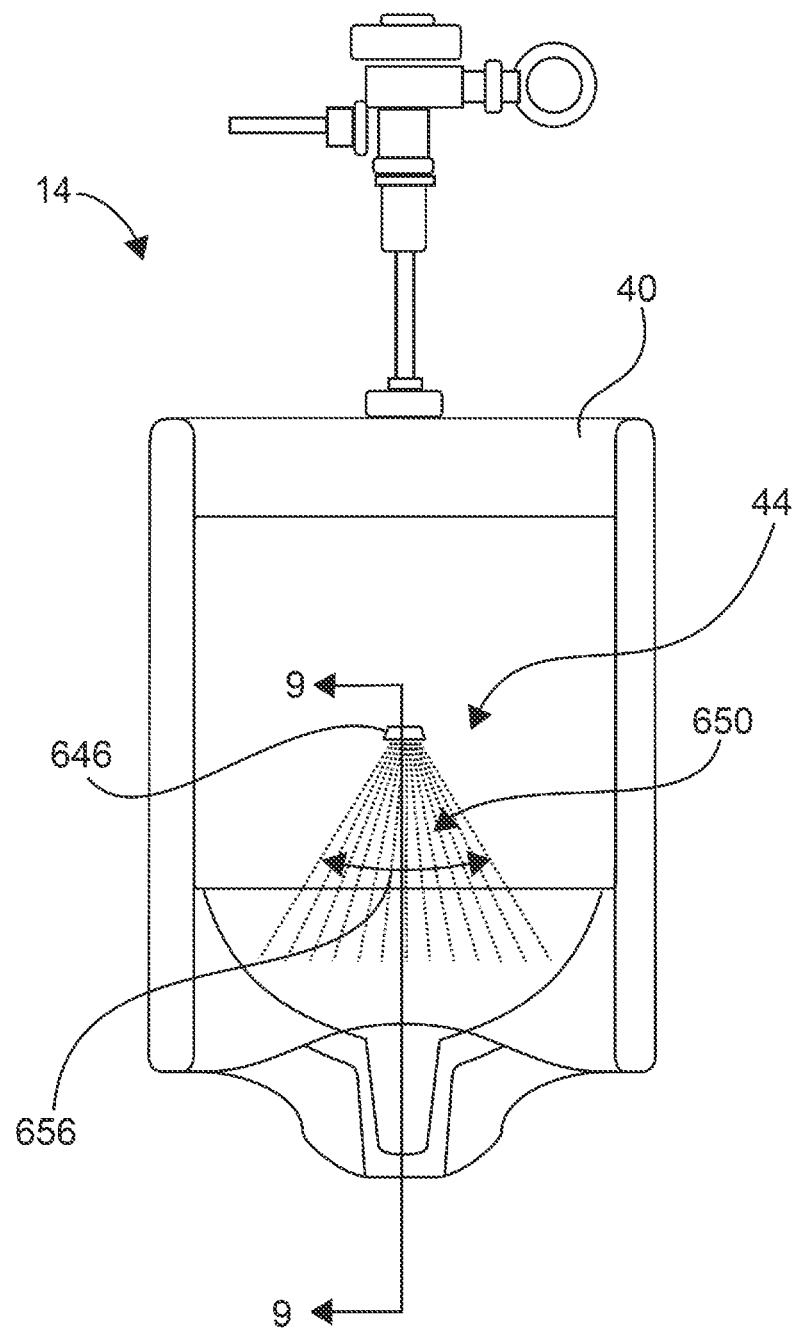
FIG. 8 is a front elevation view of a fifth embodiment of a fluid splash containment system according to the present invention.
Figure 9:
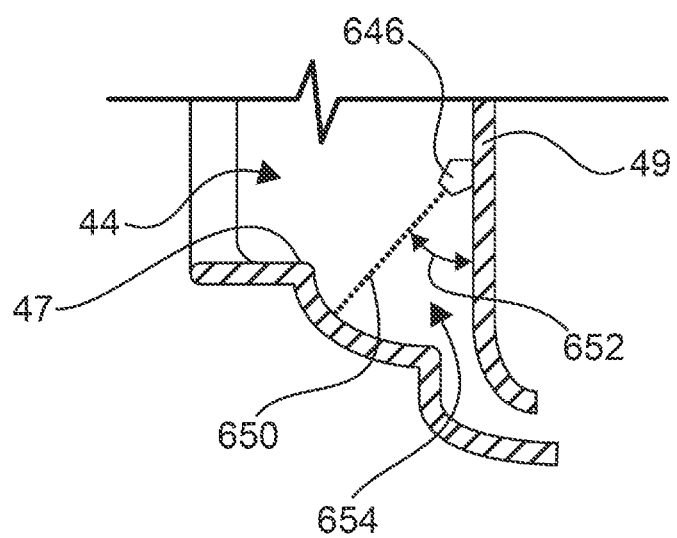
FIG. 9 is a partial cross-section view taken at line 9-9 in FIG. 8.

FIGS. 8-9 depict a fifth embodiment 14 of a splash control system according to the present invention, where similar numbering indicates identical or substantially similar structure or disclosure as with respect to the first embodiment 10. In this embodiment 14, a nozzle 646 is secured to or formed integrally with a wall 49 of a urinal 40, and aimed towards an opposite side of the cavity 44, at a desired spray angle 652 with respect to the wall 49. As with the fluid circuit of prior embodiments, a solenoid-controlled valve 124 is placed in fluid communication with the supply line 142 and electrically coupled to the power supply 122 and switch 126. If desired, an additional manual or electrically controlled flow valve 124 may be placed in series as a part of the supply line 142 so as to aid in adjusting the nozzle spray pattern 650. The supply line 142 may be an extension of or coupled (such as through a valve 32) to a standard urinal supply line, which is coupled to a water main, such as a building water main. Alternatively, supply line 142 may be gravity fed from a holding tank or even from a pump to provide desired pressure.

In this way, when activated, the spray pattern 650 generally creates a spray envelope 654, which may also be defined or at least partially surrounded by a portion of the receptacle, such as urinal wall 49. A preferred spray pattern is a flat fan pattern (or partial conical pattern) having a preferred spread angle 656. A preferred spread angle 656 is between about 45 degrees to about 135 degrees, with 80 degrees being most preferred. The spray pattern 650 contacts the urinal wall 49, preferably inside the cavity 44 and below a front lip or edge 47 of the cavity 44. Parameters such as spray angle 652, spread angle 656, pressure supplied via the supply line 142, etc., may be adjusted to so position the pattern 650. Adjustments may be made to achieve a desired spray pattern 650 and to minimize overspray outside of the vessel 40 that may be caused by excessive supply pressure.

In use, once adjusted to desired flow rate and spray pattern 650, a stream of fluid (e.g., a urine stream) may be passed from a side of the spray pattern 650 outside of the spray envelope 654 (e.g, outside of the cavity 44) through the spray pattern 650 and into the spray envelope 654 to contact the wall 49. To the extent any splashing occurs within the spray envelope 654 due to the stream of fluid contacting the vessel 40, such splashing is contained substantially within the spray envelope 654 or is at least substantially prevented from exiting the cavity 44.

Figure 10:
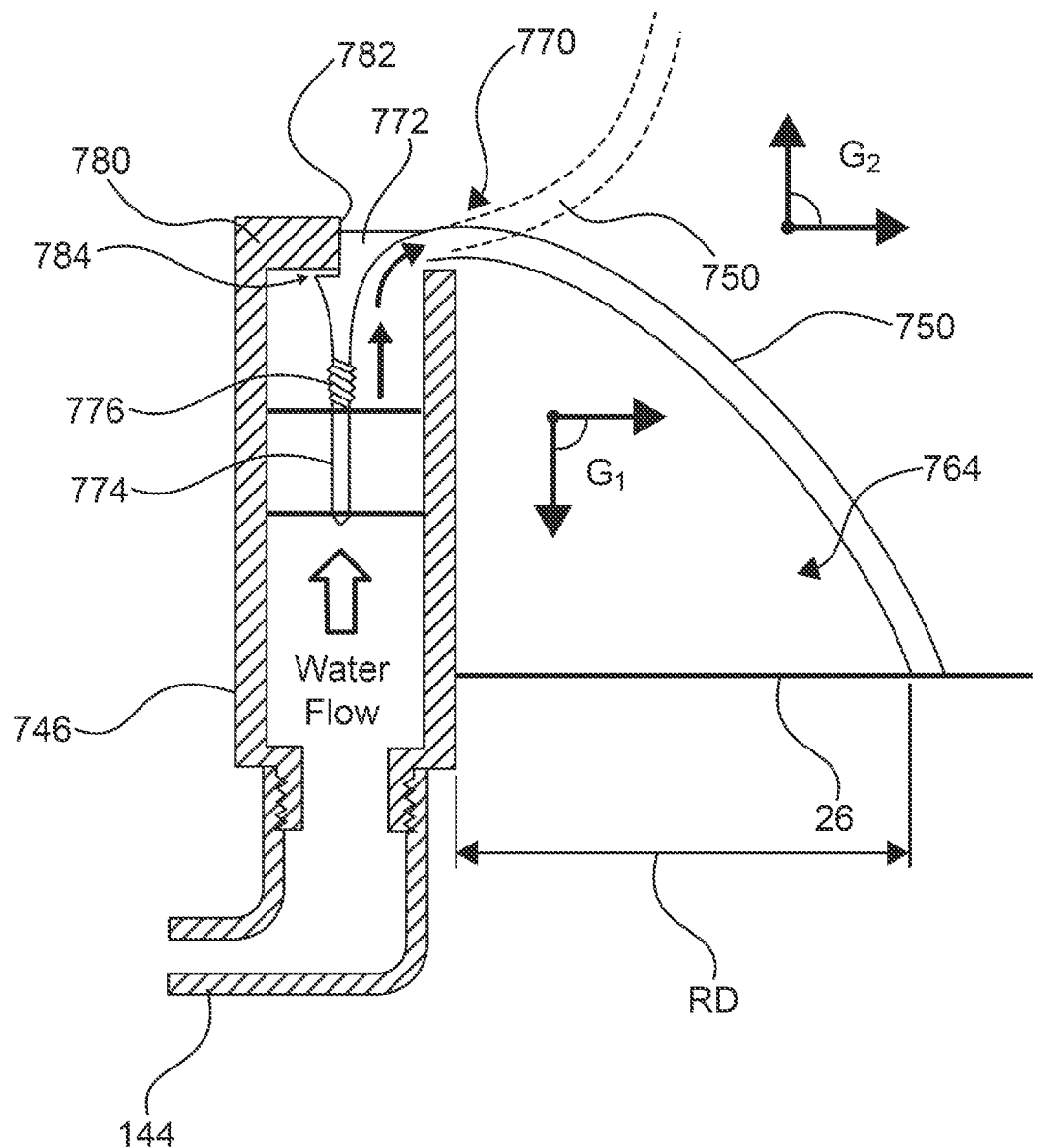
FIG. 10 is a partial cross-section view of a laminar flow dome nozzle.

FIG. 10 depicts a laminar flow dome nozzle 746, which is similar to that shown and described in Schnuckle (U.S. Pat. No. 7,775,457), FIGS. 3 and 4. As shown, the nozzle 746 receives water from a supply line 144. The body of the nozzle 746 is generally a hollow cylinder that directs water flow from supply line 142 towards an opening at an outlet end 770. In use, the nozzle 746 is fixed in position with a portion extending above the surface of the water 26 or spaced from a vessel wall, with its outlet 770 at a particular height, such as up to about 3 to 6 inches or more. The height of nozzle outlet 770 above the surface 26 is selected to correspond (at least generally) with a height of the bell or dome to be formed with the nozzle 746.

A diverter or spray head component 772 moves from a closed or retracted position abutting against or resting upon the outlet 770 to a flow position as shown in FIG. 10. The diverter 772 has a distal end 774 attached to the body of the nozzle 746, and this rigidly attached end 774 is connected to the diverter 772 with a spring, coil, or other elastic member 776 that acts to retract the diverter 772 when there is no or little water flow but to allow the diverter to telescope to an open or spray position as shown under a certain level of water flow/pressure. The diverter 772 is generally shaped to direct water outward generally transverse to the longitudinal axis of the nozzle body 746 such as substantially perpendicular (or somewhat above or below a plane perpendicular to the nozzle axis). Also, the diverter 772 is configured in some embodiments to direct water flow in a substantially equal amount or volume about the periphery of the nozzle outlet 770 to form a continuous wall of water to form a dome or bell (but in some embodiments, a partial dome is formed with overlapping, adjacent domes mating so as to provide an enclosed chamber for fog and/or flow path for flammable/explosive gas).

Water is discharged from the nozzle between the outlet 770 and the diverter 772 (e.g., is directed outward by spray head or diverter 772). As shown, the discharged water forms a bell or dome 750 with a wall of water that extends from the nozzle outlet 770 to the water surface 26. The water wall 412 has a thickness that may vary (such as from about 0.1 to about 0.5 inches or more) but preferably with few or no gaps as may be achieved when the flow rate of the water is matched to the nozzle 746 to achieve relative laminar or non-turbulent flow (e.g. the wall 750 is made of substantially continuous flow of water or of volume of water in laminar flow). Also, while in some embodiments the wall 750 extends about 360 degrees about the nozzle 746 (e.g., at a substantially constant radius from the central axis of the body of the nozzle 746), it may be desirable to limit the wall 750 to less than 360 degrees about the nozzle 746. To limit the wall or control the shape of the wall 750, a flow interrupter 780 may be inserted into the nozzle 746 or formed integrally therewith. The interrupter 780 may cover and prevent water flow through a desired portion or angle of the outlet 770. As shown, approximately 180 degrees of flow has been interrupted, so as to provide a substantially half dome 750. The interrupter 780 provides a guide surface 782 and a diverter travel limit surface 784 to cooperate with the diverter 772. The guide surface 782 preferably maintains rotational alignment of the diverter 772 within the nozzle 746. The diverter travel limit surface 784 preferably provides a seat to which a portion of the diverter may mate to prevent overextension of the diverter 772 under high water pressure conditions.

The dome wall 750 (or its inner surface) defines an inner void space or hollow chamber 764. The size of the dome 750 and its inner chamber 764 are defined by a height (e.g., the height or amount the nozzle 770 extends above the water surface 26) and by a radius $R_D$ that varies with the height and angle that the nozzle 746 is positioned with respect to the water surface 26, the nozzle/diverter 772 design, and the flow rate of water. The radius $R_D$ of the dome 750 may be intentionally varied or set during operation of assembly such as by changing the flow rate of water (e.g., by operating a valve(s) 32,148 in the line 142,144 to control flow, or the like). Additionally, the position angle of the nozzle 146 may be chosen to achieve the desired laminar flow dome shape/pattern. For a relatively vertical relationship relative to the water surface 26 can be selected to provide the dome 750 as shown. If rotated clockwise, gravity will act on the dome 750 throughout a pattern $G_1$ with respect to the nozzle 746, the radius $R_D$ will shorten, and the dome 750 will become flatter, so as to create a substantially vertical wall of laminar flow if the nozzle 746 is rotated to a position substantially parallel to the water surface 26. If the nozzle 146 is rotated more than 90 degrees clockwise, then the wall 750' will begin to fall away from the body of the nozzle 746 throughout a gravity pattern $G_2$ with respect to the nozzle 746. Regardless of position of the nozzle 746 with respect to the water surface 26 (or with respect to a vessel surface), a preferred laminar flow shape can be achieved through variations of the nozzle outlet 770, diverter 772, interrupter 780, and water pressure.

Figure 11:
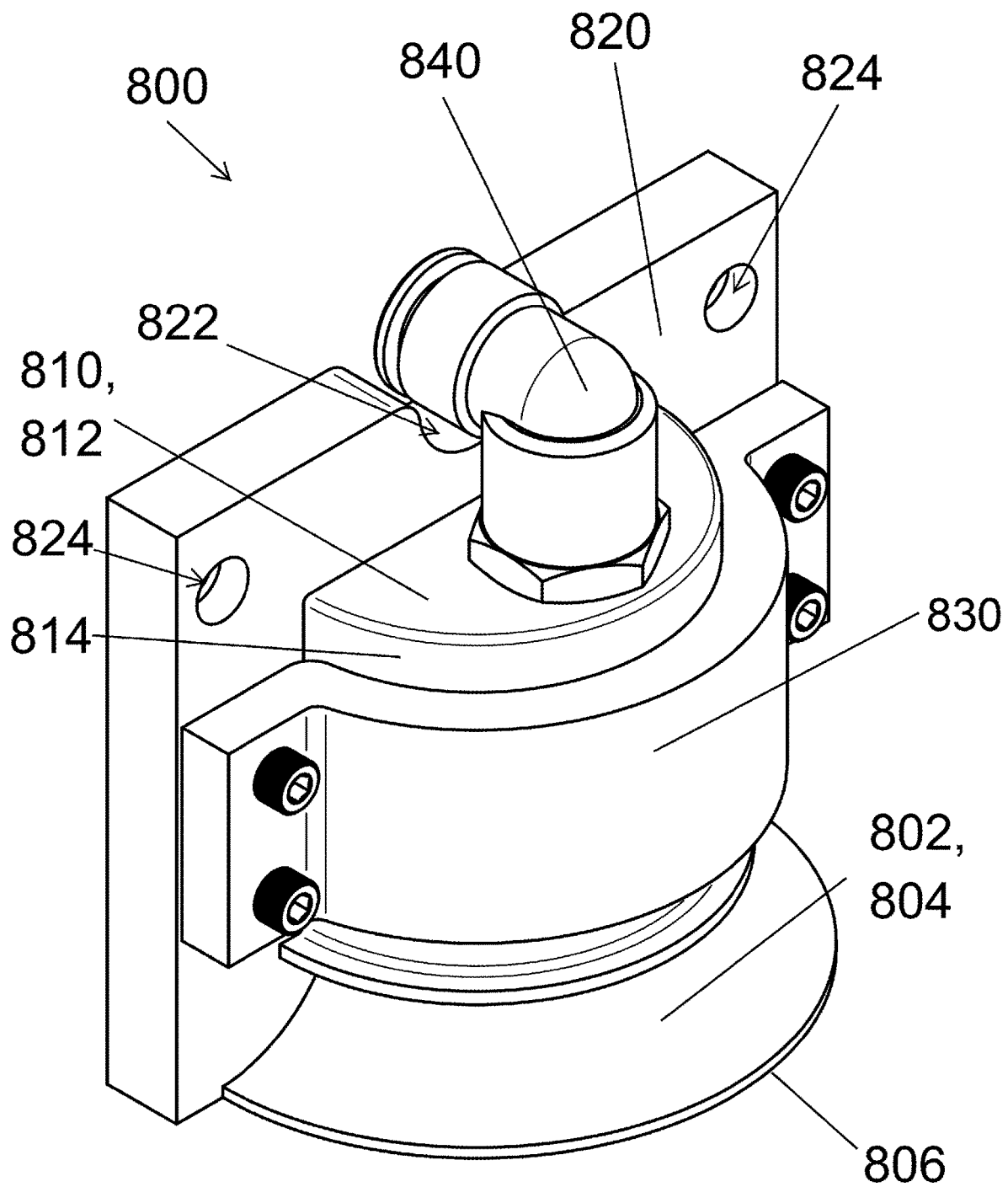
FIG. 11 is a perspective view of an alternate flow dome nozzle according to the present invention.
Figure 12:
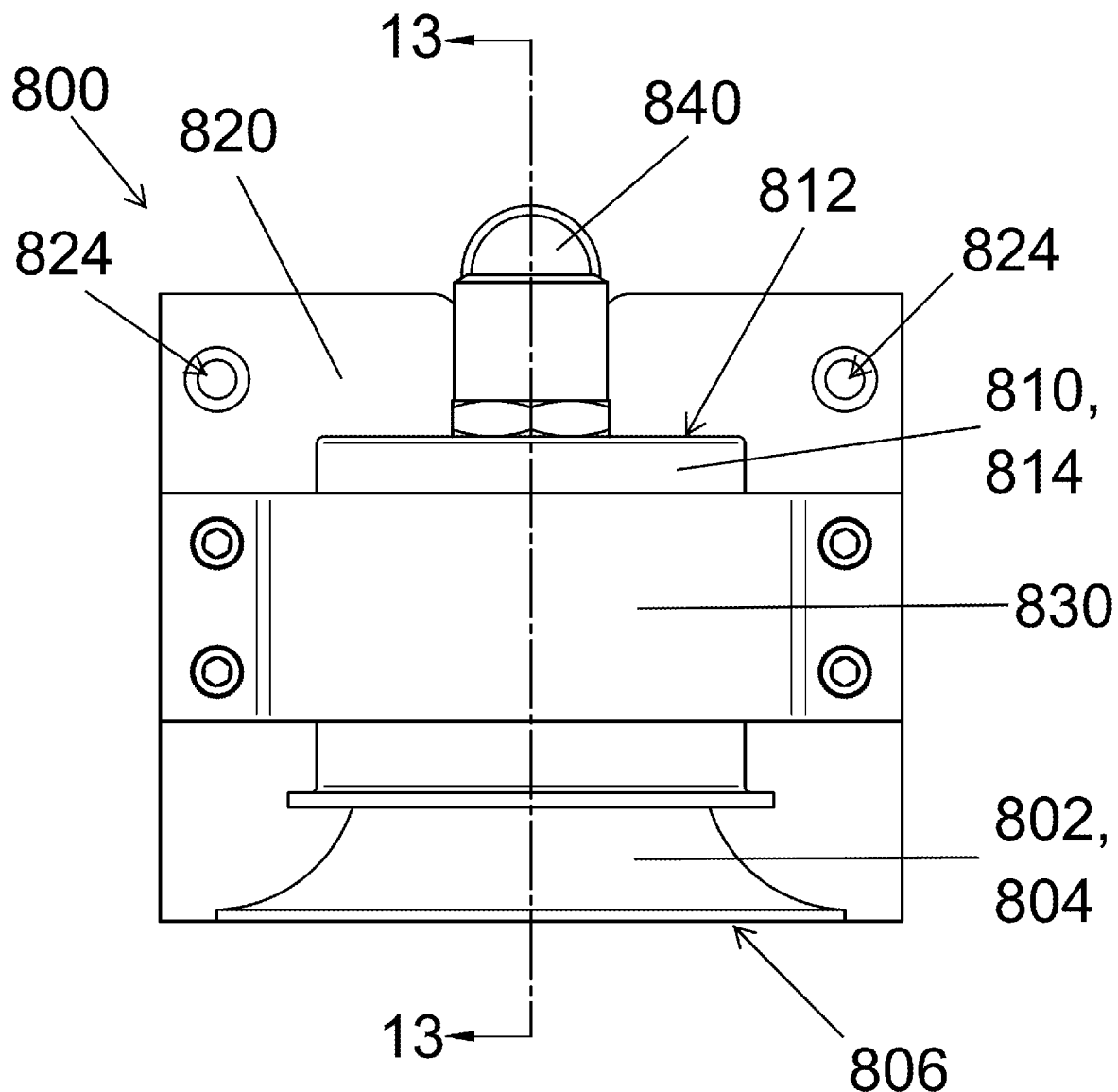
FIG. 12 is a front view of the flow dome nozzle of FIG. 11.
Figures 13A, 13B:
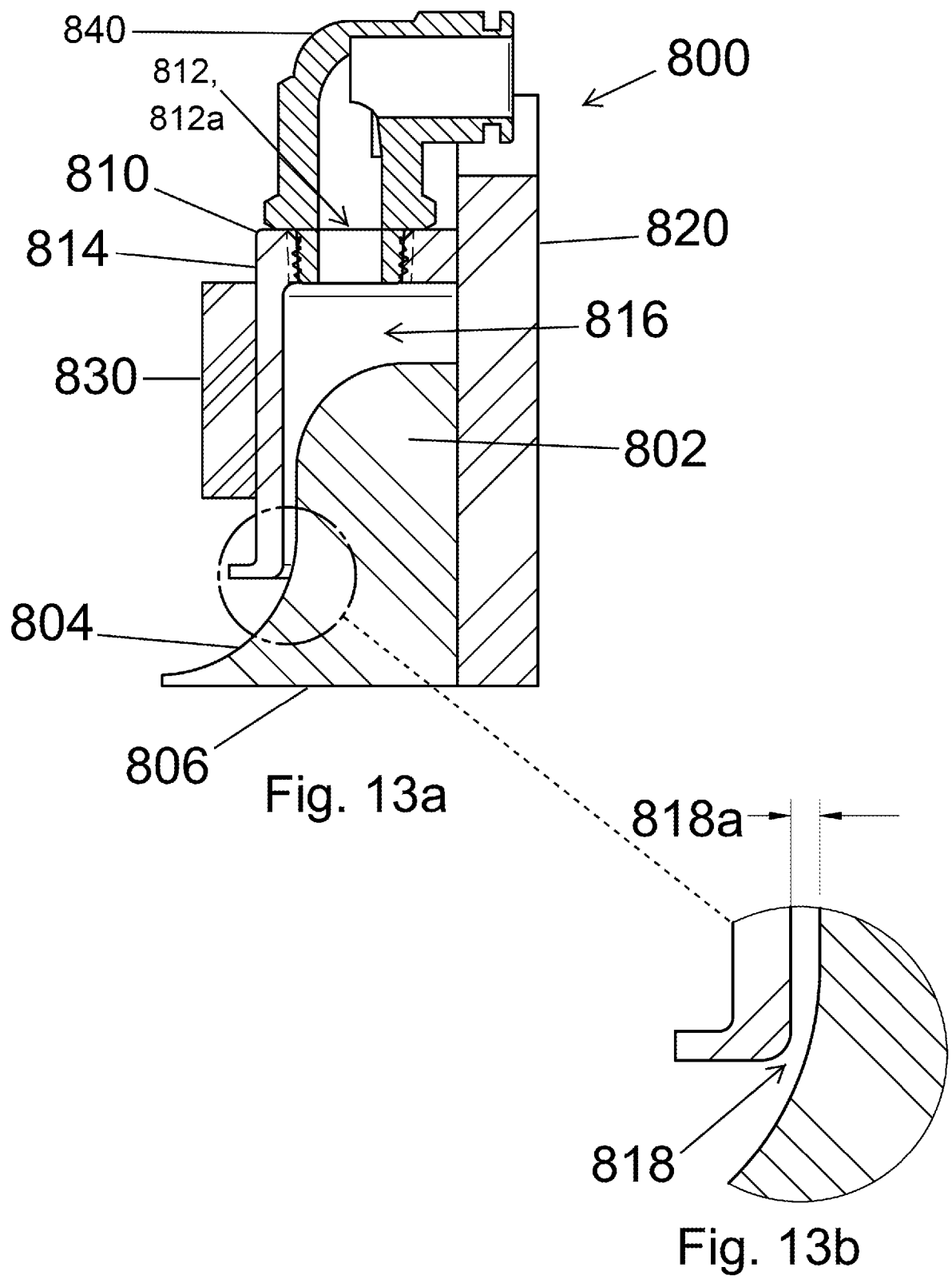

FIGS. 11-13 depict an alternative embodiment of a nozzle 800 according to the present invention. The nozzle 800 generally comprises a shell 810 suspended over an insert 802 by a bracket 830 affixed to a plate 820, creating a gap 818 through which liquid may flow. The liquid may then be directed by an insert curve 804 onto the hydrostatic liquid surface 26 in a substantially dome-like spray pattern, as described in previous embodiments.

The insert 802 preferably provides a semi-bell-shaped fluid flow surface, which may be provided substantially by a solid bell divided in half vertically, where the flat side of the insert 802 is affixed to the plate 820 by fasteners (e.g. bolts and/or screws), or formed integrally therewith. The insert 802 is preferably made from a durable synthetic polymer, such as Nylon 66 or even as a portion of the porcelain structure of a toilet or urinal (if a fixed position is desirable), which has a high mechanical strength, is fatigue and wear resistant, and has good sliding properties. The insert base 806 is preferably at least substantially flush with the bottom of the plate 820. The insert 802 also preferably has a height that is less than the height of the plate 820, as seen in FIG. 11.

Placed over top of the insert 802, though not quite touching along at least a majority of the fluid flow surface, the shell 810 is preferably substantially in the shape of a hollow cup divided in half vertically in the same manner as the insert 802. The flat side of the shell 810 rests against the plate 820, though may not be held in place itself by fasteners. For instance, a bracket 830 holds the shell 810 in place and the bracket 830 is affixed to the plate 820 by fasteners in a similar manner to the insert 802. The shell 810 comprises a shell top 812 joined to a shell wall 814. The shell top 812 further comprises an interface, such as a threaded hole 812a, to couple to a fluid input, such as the elbow joint 840, discussed below.

When the shell 810 is positioned over the insert 802 and held in place by the bracket 830, the shell top 812, wall 814, and the insert 802 define a hollow chamber 816 which is filled with liquid during use. The shell wall 814 also nearly touches the insert curve 804, but is slightly spaced away from the curve 804, defining the gap 818 comprising a gap width 818a. This width 818a controls the liquid flow from the nozzle 800. By loosening the bracket 830 and selectively adjusting (e.g., by sliding) the shell 810 higher or lower on the plate 820, thereby changing the gap width 818a by causing the shell wall 814 to be further or nearer to the insert curve 804, the liquid flow may be adjusted according to the plumbing system in use (e.g., at average system pressure), user preference, or both. The shell 810 is preferably made of the same material (e.g., synthetic polymer) as the insert 802.

The plate 820 is preferably a substantially rectangular piece of the same material (e.g., durable synthetic polymer) as the insert 802 and shell 810. A semi-circular notch 822 may be preferably cut into the top of the plate 820, to allow an elbow joint 840 (or other fluid source) to reach the shell 810. The plate 820 also preferably includes a number of mounting apertures 824, which may be threaded or unthreaded to allow the various fasteners of the insert 802 and bracket 830 to affix to the plate 820. At least some of the apertures 824 also allow the plate 820 to be affixed to an intermediate mounting structure between the plate 820 and a vessel (e.g., toilet 20) or directly to a vessel.

The elbow joint 840 is connected to the liquid supply line 142 or feed line 144 to supply liquid to the nozzle 800. When installed, the elbow joint 840 is place with one end fitting into the semi-circular notch 822 in the plate 820 and the other end affixed to the threaded hole 812a in the shell top 812. When the nozzle 800 is in use, liquid from the liquid supply line 142 flows through the elbow joint 840 (at building supply line 142 pressure or reduced pressure) and into the hollow chamber 816 formed by the shell 810 and insert 802. The liquid then flows through the gap 818 and down the insert curve 804 to create a preferably substantially half-dome shaped spray pattern (which may be adjusted to comprise at least substantially laminar flow at the gap exit 818) before making contact with the hydrostatic liquid surface 26. The dome flow then serves substantially similar functions as those described in other embodiments of the invention above.

The nozzle 800 may optionally include other features as well to automatically account for differing environments instead of requiring a user to adjust the shell 810. For instance, a restrictor valve (e.g., 148) may be place in between the liquid supply line 142 and the elbow joint 840 that restricts the liquid flow. This restrictor valve 842 may be pre-set to a preferable pressure (less than the building plumbing pressure) at which the nozzle 800 having a pre-determined gap width 818a performs optimally given the pressure of the liquid system in use.

Alternatively, the nozzle may further comprise a bias spring (not shown) displaced in the chamber 816 and between the shell 810 and insert 802 or externally between the shell 810 and an external spring flange (if the shell 810 is to be movable with respect to the insert 802) or externally between the insert 802 and a lower spring flange (if the insert 802 is to be moveable with respect to the shell 810). In any such spring configuration, the insert/shell combination may then be relatively spring-biased, such that a stronger liquid flow allowing the spring to lengthen and the gap width 818a to increase, allowing more liquid to flow through the gap 818. In the opposite case, a weaker liquid flow would create less pressure between the insert 802 and the shell 810, allowing the spring 844 to compress, decreasing the gap width 818a and allowing less liquid to flow through the gap 818. One or more of these optional parts (flow restrictor and/or bias spring) may serve to more automatically regulate the liquid flow through the gap 818 to prevent a user having to adjust the gap width 818a to find a preferable or optimal nozzle flow for a given supply line 142 pressure.

The nozzle 800 has other applicable uses outside of plumbing components as well. For instance, the nozzle 800 may be used in fountains, animal products, gardening and plant management, fire prevention, food product development and presentation, and many other areas.

The foregoing is considered as illustrative only of the principles of the invention. Furthermore, because numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A system comprising:
a waste receptacle capable of holding a fluid; and
a first nozzle supported by the waste receptacle, the first nozzle configured to direct a first laminar flow of a liquid received from a liquid supply into the waste receptacle, the first laminar flow comprising an at least partial dome of the liquid.

2. The system according to claim 1, further comprising a supply line through which the liquid is to be received by the first nozzle.

3. The system according to claim 2, further comprising a first flow valve capable of controlling a flow of liquid through the supply line.

4. The system according to claim 3, further comprising a power supply configured to selectively activate the first flow valve.

5. The system according to claim 4, the power supply being controlled by a switch.

6. The system according to claim 5, wherein the switch is a normally open momentary switch.

7. The system according to claim 5, the system further comprising a motion sensor configured to selectively activate the switch.

8. The system according to claim 4, the power supply being controlled by a timer configured to actuate the valve after a predetermined amount of time.

9. The system according to claim 8, wherein the predetermined amount of time is programmable.

10. The system according to claim 4, wherein the first flow valve is a solenoid-controlled valve.

11. The system according to claim 3, the system further comprising a second flow valve placed in series with the supply line, between the first flow valve and the nozzle.

12. The system according to claim 11, wherein the second flow valve is a restrictor valve configured to limit flow of the liquid to the nozzle to a maximum rate.

13. The system according to claim 2, wherein the supply line is operatively coupled to a water main line.

14. The system according to claim 2, wherein the supply line is gravity fed from a holding tank.

15. The system according to claim 1, wherein the waste receptacle comprises a drain opening and a first opening through which waste is received, the at least partial dome being visible through the first opening.

16. The system according to claim 1, wherein the first flow valve is a manually operated liquid control valve.

17. A method comprising the steps of:
supporting a first nozzle relative to a waste receptacle, the first nozzle configured to direct a first laminar flow of a liquid received from a liquid supply into the waste receptacle, the first laminar flow comprising an at least partial dome of the liquid.

18. A method comprising the steps of:
directing a first flow of a liquid received from a liquid supply into a waste receptacle, the first flow comprising an at least partial dome of the liquid.

19. The method according to claim 18, wherein the first flow is an at least substantially laminar flow.

* * * * *